United States Patent
Shiraishi et al.

(10) Patent No.: US 9,835,127 B2
(45) Date of Patent: Dec. 5, 2017

(54) INTERNAL COMBUSTION ENGINE IGNITION DEVICE AND IGNITION METHOD

(71) Applicant: NISSAN MOTOR CO., LTD., Yokohama-shi, Kanagawa (JP)

(72) Inventors: Taisuke Shiraishi, Kawasaki (JP); Masaharu Kassai, Yamato (JP)

(73) Assignee: NISSAN MOTOR CO., LTD., Yokohama-shi, Kanagawa (JP)

( * ) Notice: Subject to any disclaimer, the term of this patent is extended or adjusted under 35 U.S.C. 154(b) by 0 days.

(21) Appl. No.: 14/785,656

(22) PCT Filed: Jan. 21, 2014

(86) PCT No.: PCT/JP2014/051096
§ 371 (c)(1),
(2) Date: Oct. 20, 2015

(87) PCT Pub. No.: WO2014/192325
PCT Pub. Date: Dec. 4, 2014

(65) Prior Publication Data
US 2016/0069319 A1    Mar. 10, 2016

(30) Foreign Application Priority Data

May 30, 2013    (JP) ................................. 2013-113539

(51) Int. Cl.
*F02P 9/00*    (2006.01)
*F02P 3/045*    (2006.01)
(Continued)

(52) U.S. Cl.
CPC .............. *F02P 9/002* (2013.01); *F02P 3/045* (2013.01); *F02P 3/053* (2013.01); *F02P 5/152* (2013.01); *F02P 5/1528* (2013.01); *Y02T 10/46* (2013.01)

(58) Field of Classification Search
CPC .......... F02P 3/045–3/0456; F02P 9/002; F02P 11/00; F02P 11/06; F02P 5/152–5/1522;
(Continued)

(56) References Cited

U.S. PATENT DOCUMENTS 5,363,046 A * 11/1994 Shimasaki .............. F02P 13/00
324/126
5,477,104 A * 12/1995 Tanabe .................... H01T 13/38
313/137

(Continued)

FOREIGN PATENT DOCUMENTS

CN            2471616 Y      1/2002
JP        2000-291519 A     10/2000
(Continued)

*Primary Examiner* — Erick Solis
*Assistant Examiner* — Robert Werner
(74) *Attorney, Agent, or Firm* — Drinker Biddle & Reath LLP

(57) ABSTRACT

When an operating condition including load and speed of an internal combustion engine is in a prescribed low-speed high-load region, i.e., an energy suppression region, having a possibility causing pre-ignition, energization time TDWLMIN for the energy suppression region is selected as a primary coil energization time. In other normal regions, normal energization time TDWL is selected. Normal energization time TDWL has a characteristic such that the normal energization time shortens, as the engine speed increases. In a low speed region, a given energization time that can fulfill a discharge energy required in a high exhaust gas recirculation region is provided. Energization time TDWLMIN for the energy suppression region is constant regardless of engine speeds and relatively short, and is set to a level such that a coil generated maximum voltage does not exceed a withstand voltage of a spark plug even when no-discharge occurs due to pre-ignition.

5 Claims, 6 Drawing Sheets

(51) Int. Cl.
*F02P 5/152* (2006.01)
*F02P 3/05* (2006.01)

(58) Field of Classification Search
CPC ......... F02D 2200/10; F02D 2200/1002; F02D 2200/101
USPC .... 123/406.13–406.14, 406.24–406.27, 609, 123/630; 701/111
See application file for complete search history.

(56) References Cited

U.S. PATENT DOCUMENTS

2002/0056445 A1* 5/2002 Inagaki ................. F02P 3/0456
123/609
2015/0122239 A1* 5/2015 Tojo ...................... F02P 3/0453
123/609

FOREIGN PATENT DOCUMENTS

| JP | 2007-239603 A | 9/2007 |
| JP | 2009-036028 A | 2/2009 |
| JP | 2012-136965 A | 7/2012 |

* cited by examiner

INTERNAL COMBUSTION ENGINE IGNITION DEVICE AND IGNITION METHOD

TECHNICAL FIELD

The present invention relates to an internal combustion engine ignition device and ignition method using an ignition coil including a primary coil and a secondary coil.

BACKGROUND ART

On ignition devices using an ignition coil, a high discharge voltage is produced or induced in a secondary coil by interrupting primary current at predetermined ignition timing after having energized the primary current to the primary coil, thus generating an electric discharge between the opposing electrodes of a spark plug connected to the secondary coil. Basically, the discharge voltage and discharge energy induced in the secondary coil correlates with the primary coil energization time (see FIG. 6).

The aforementioned primary coil energization time, which influences the discharge energy, is generally determined by engine revolution speed. Conventionally, the lower the engine speed, the longer the energization time. However, Patent document 1 teaches that the energization time is lengthened in a high load region, whereas the energization time is shortened in a low load region.

As one of abnormal combustion conditions of an internal combustion engine, pre-ignition in which combustion starts before ignition timing is generally known. A so-called super-knock phenomenon is a type of pre-ignition. Such pre-ignition tends to occur in a low-speed high-load region in either of a natural-aspirated internal combustion engine and a supercharger-equipped internal combustion engine. Assuming that the pre-ignition is occurring, the in-cylinder gas density at original ignition timing becomes high. In such a situation, even when primary current is interrupted and thus a high voltage is produced, a so-called no-discharge state may possibly occur without any electric discharge between the electrodes of a spark plug. FIG. 11 shows comparison between an in-cylinder pressure change during normal combustion (a) in which ignition combustion has been achieved normally at ignition timing (original timing) and an in-cylinder pressure change during the occurrence of pre-ignition (b). As appreciated from these characteristics, during the occurrence of pre-ignition a high in-cylinder pressure has already been produced at the original ignition timing, and thus there is a possibility for no-discharge to occur without any desired electric discharge. In the case of such a no-discharge state, a coil generated maximum voltage tends to be applied to the spark plug. An electric discharge through the insulator of the spark plug occurs, and hence there is a possibility for the spark plug to be damaged. By the way, the coil generated maximum voltage during the no-discharge also correlates with the primary coil energization time (see FIG. 8).

Therefore, suppose that the energization time is lengthened in a high-load region as disclosed in the Patent document 1. In the case of no-discharge during the occurrence of pre-ignition, there is a higher possibility for the spark plug to be damaged.

In contrast, suppose that a normal discharge energy is set lower in order to avoid the spark plug from being damaged even in the presence of no-discharge. In such a case, it is impossible to achieve more certain ignition in a so-called hardly-flammable region, such as an operating region in which a large amount of exhaust gas recirculation (EGR) is performed, a lean-burn operating region, a Miller-cycle combustion operating region and the like.

CITATION LIST

Patent Literature

Patent document 1: Japanese Patent Provisional Publication No. JP2012-136965

SUMMARY OF INVENTION

It is, therefore, in view of the above, the invention is characterized in that, in an ignition device of an internal combustion engine in which a discharge voltage is generated between electrodes of a spark plug connected to a secondary coil by energizing a primary current to a primary coil of an ignition coil and interrupting the primary current, in a normal region other than a prescribed low-speed high-load region an energization time for the primary coil is set according to an engine speed, whereas in the prescribed low-speed high-load region the energization time is set relatively shorter than the energization time for the normal region for a same engine speed such that a maximum voltage generated under no-discharge when having interrupted the primary current does not exceed a withstand voltage of the spark plug.

That is, an operating region, in which pre-ignition that causes no-discharge may possibly occur, is limited to a specified low-speed high-load region. There is a less tendency for pre-ignition to occur under low-load operating conditions or under operating conditions at high speeds to some extent. Therefore, the energization time for the primary coil is set comparatively shorter in a prescribed low-speed high-load region having a possibility of causing pre-ignition, so as not to exceed the withstand voltage of a spark plug even when no-discharge occurs. This avoids damage to the spark plug even when no-discharge occurs due to pre-ignition.

As a matter of course, there is no possibility of no-discharge unless pre-ignition occurs in such a low-speed high-load region, and hence normal discharge ignition is performed. A low-speed high-load region having a possibility of causing pre-ignition is a high-load condition in which an ignitability of the air-fuel mixture is high, thereby ensuring good ignition even by a comparatively short energization time.

According to the invention, it is possible to avoid damage to a spark plug even when no-discharge occurs due to pre-ignition. Also, in all operating regions other than the specified low-speed high-load region having a possibility of causing pre-ignition, a relatively high discharge energy can be supplied, and hence more certain ignition can be achieved even in a so-called hardly-flammable region, such as combustion with a large amount of exhaust gas recirculation (EGR).

DESCRIPTION OF EMBODIMENTS

One embodiment of the present invention is hereinafter described in detail with reference to the drawings.

Figure 1:
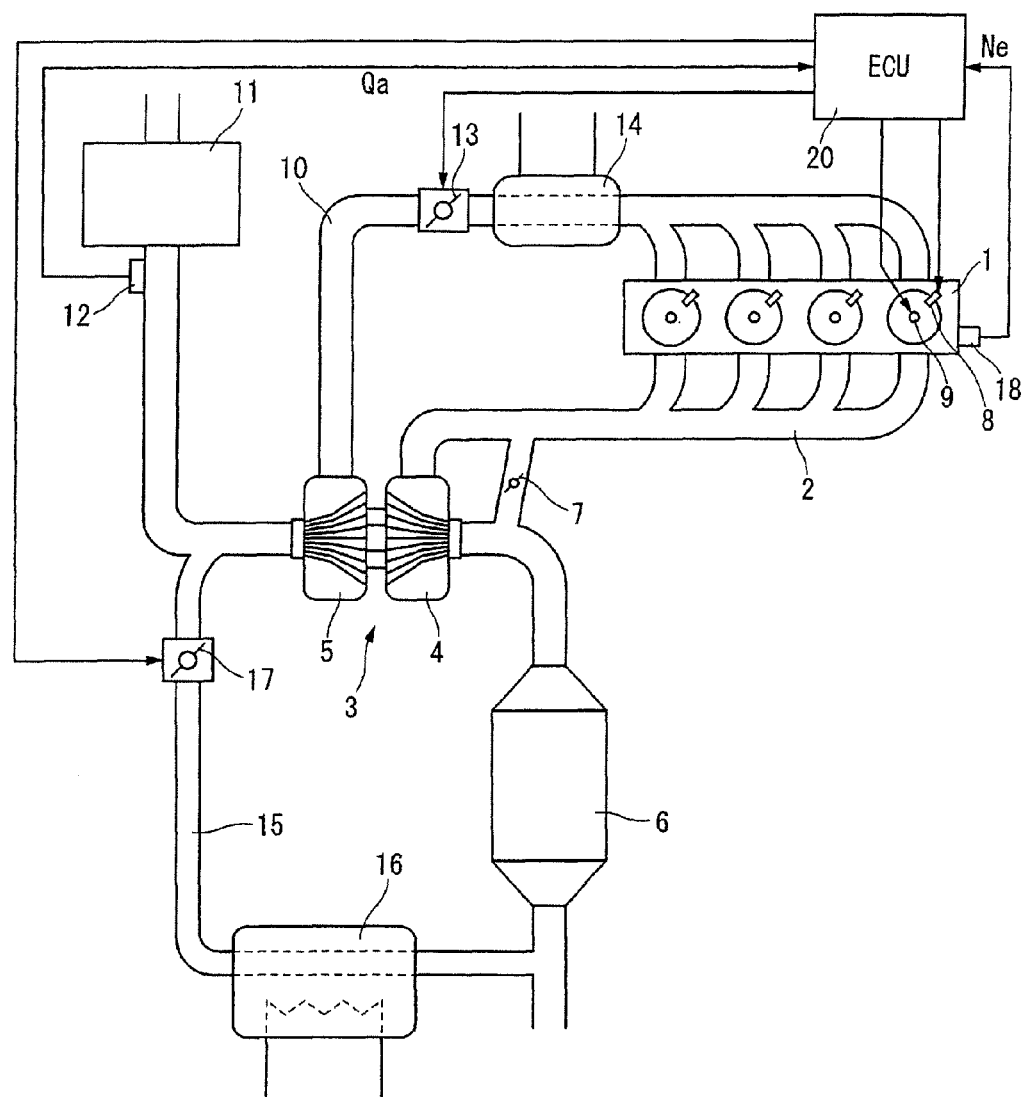
FIG. 1 is an explanatory view illustrating the system configuration of one example of an internal combustion engine to which an ignition device of the invention is applied.

FIG. 1 shows an exhaust gas recirculation (EGR) device equipped supercharged engine as one example of an internal combustion engine 1 to which the ignition device of the invention is applied. An exhaust turbine 4 of a turbo supercharger 3 is placed in an exhaust passage 2 of internal combustion engine 1 that is a gasoline engine. A three-way catalytic converter 6 is disposed on the downstream side of the exhaust turbine. An exhaust muffler (not shown) is further arranged on the downstream side of exhaust passage 2. Exhaust passage 2 is opened through the exhaust muffler to the outside. The aforementioned exhaust turbine 4 is equipped with a well-known waste gate valve 7 for supercharging pressure control. In the shown embodiment, internal combustion engine 1 is constructed by an in-cylinder direct-injection type. A fuel injection valve 8 which injects fuel into a cylinder is provided for each individual engine cylinder. A spark plug 9 is installed in the center of each cylinder. Injection timing and injection amount of fuel injection valve 8, and ignition timing of spark plug 9 are controlled by an engine control unit 20.

An air cleaner 11, an airflow meter 12, and a throttle valve 13 are arranged in an intake passage 10 of internal combustion engine 1 in that order from the upstream side. A compressor 5 of turbo supercharger 3 is located between the airflow meter 12 and the throttle valve 13. By the way, in the embodiment, a water-cooled or air-cooled intercooler 14 is installed on the downstream side of throttle valve 13. The opening of throttle valve 13 is controlled, based on a detection signal of an accelerator opening sensor (not shown), responsively to a control signal from the engine control unit 20. Detection signals from various sensors, containing a detection signal from a crankangle sensor 18 indicating engine revolution speed Ne, a detection signal from the airflow meter 12 for detecting an intake air quantity Qa equivalent to an engine load, and the like, are inputted into the engine control unit 20.

Also, an EGR passage 15, which constructs part of the exhaust gas recirculation (EGR) device, is branched from the downstream side of catalytic converter 6 of exhaust passage 2. The distal end of the EGR passage is connected to the intake passage 10 upstream of the compressor 5. A water-cooled or oil-cooled EGR gas cooler 16 is installed in the EGR passage 15 for cooling EGR gases. An exhaust gas recirculation (EGR) control valve 17 is installed downstream of the EGR gas cooler for controlling an exhaust gas recirculation quantity according to a target exhaust gas recirculation rate. The opening of EGR control valve 17 is controlled, based on an engine operating condition including load and revolution speed of internal combustion engine 1 as parameters, by the engine control unit 20.

Figure 2:
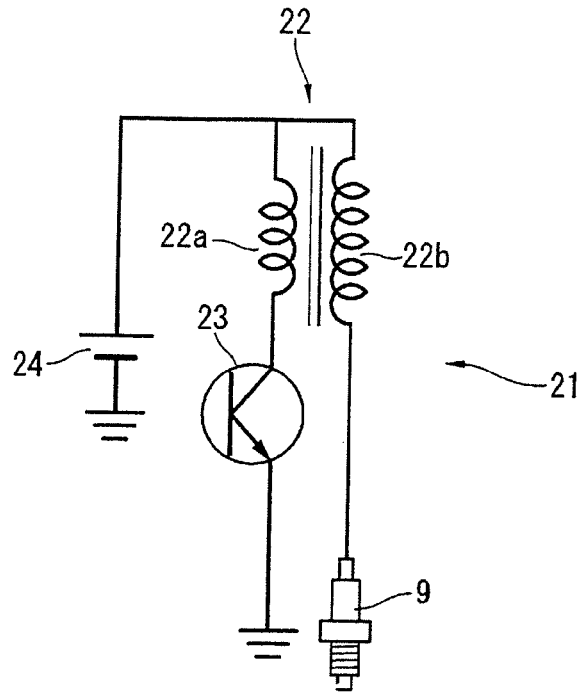
FIG. 2 is an explanatory view illustrating the configuration of the essential part of the ignition device.

As shown in FIG. 2, an ignition unit 21 is connected to the spark plug 9 of each engine cylinder for outputting a discharge voltage to the spark plug 9 responsively to an ignition signal from the engine control unit 20. Ignition unit 21 includes an ignition coil 22 employing a primary coil 22a and a secondary coil 22b for boosting or stepping up a voltage of a battery 24, and an igniter 23 for controlling energization/interruption of a primary current to the primary coil 22a of ignition coil 22. Spark plug 9 is connected to the secondary coil 22b of ignition coil 22. Igniter 23 is driven by a control signal from the engine control unit 20.

The basic ignition action of the ignition device of the embodiment is not different from a general ignition device. That is, a primary current is supplied or energized through the igniter 23 to the primary coil 22a of ignition coil 22 for a given energization time (i.e., an energization time TDWL or an energization time TDWLMIN, both described later), and then a high discharge voltage is induced or produced in the secondary coil 22b by interrupting the primary current. Thus, an electric discharge occurs between the opposing electrodes of spark plug 9 with a breakdown in the air-fuel mixture.

Hereupon, in the shown embodiment, the previously-noted energization time is selected, based on an engine operating condition, from either one of two kinds of characteristics.

Figure 4:
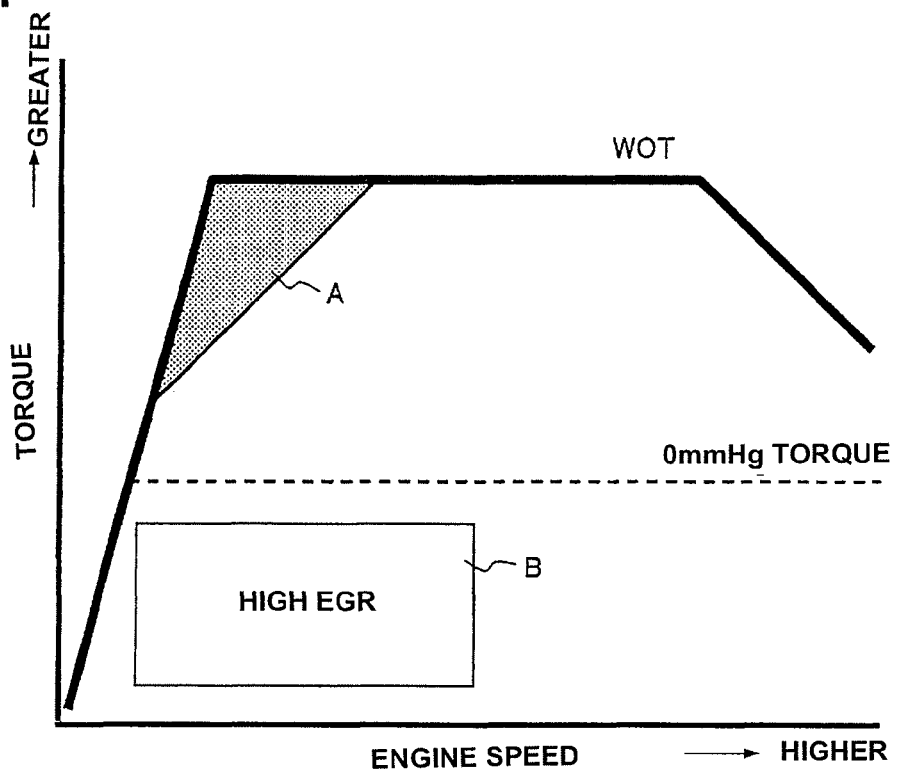
FIG. 4 is a characteristic diagram illustrating an operating region in which switching between energization times is performed.

That is to say, as shown in FIG. 4, regarding an operating region, determined based on load and revolution speed of internal combustion engine 1, a prescribed low-speed high-load region in which the engine speed is lower than or equal to a certain revolution speed and the engine load is higher than or equal to a certain load is predetermined as an energy suppression region "A". In this energy suppression region "A", a comparatively short energization time TDWLMIN is selected such that a coil generated maximum voltage does not exceed a withstand voltage of spark plug 9 even under no-discharge when having interrupted the primary current. In operating regions other than the energy suppression region "A", a normal energization time TDWL is selected. The energy suppression region "A" corresponds to an operating region having a possibility that pre-ignition, namely, an abnormal combustion condition in which combustion starts before ignition timing, may occur to some extent. Pre-ignition tends to occur due to a variety of conditions occurred in concurrence with each other, for example, a temperature condition including an intake air temperature and an engine temperature of internal combustion engine 1, a transient change in operating conditions, and the like. However, it is preferable that an operating condition having a possibility causing pre-ignition rarely should be included in the energy suppression region "A".

By the way, a region corresponding to the high load side higher than "0 mmHg-torque" level indicated by the broken line in FIG. 4 is a supercharging region in which the supercharging pressure is a positive pressure. The previously-discussed energy suppression region "A" exists within the supercharging region. An operating region "B" schematically indicated as a rectangular area in FIG. 4 shows an exhaust gas recirculation (EGR) region in which a large amount of exhaust gas recirculation (EGR) is performed. The high EGR region "B" is defined as a hardly-flammable operating region in which a high discharge energy is required, because of a deteriorated ignitability at a high exhaust gas recirculation rate. The operating region "B" in which a high discharge energy is required exists within a non-supercharging region on the low load side, and also exists within a revolution speed range approximately overlapping with a specific revolution speed range of the energy suppression region "A".

Figure 3:
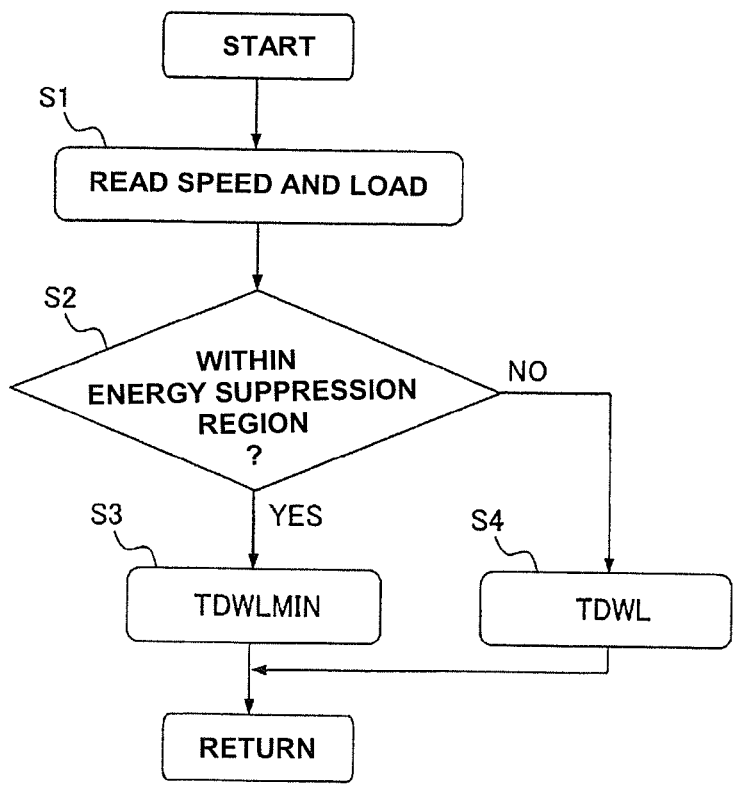
FIG. 3 is a flowchart illustrating processing flow for performing switching between energization times.

Referring to FIG. 3, there is shown the flowchart for performing switching between energization time characteristics. At step S1, a revolution speed and a load of internal combustion engine 1 are read. At step S2, a check is made to determine whether the engine speed and the engine load are within the energy suppression region "A" shown in FIG. 4. When the operating region is within the energy suppression region "A", energization time TDWLMIN for the energy suppression region is selected as an energization time for the primary coil 22a (step S3). Conversely when the operating region is out of the energy suppression region "A", normal energization time TDWL is selected (step S4).

Figure 5:
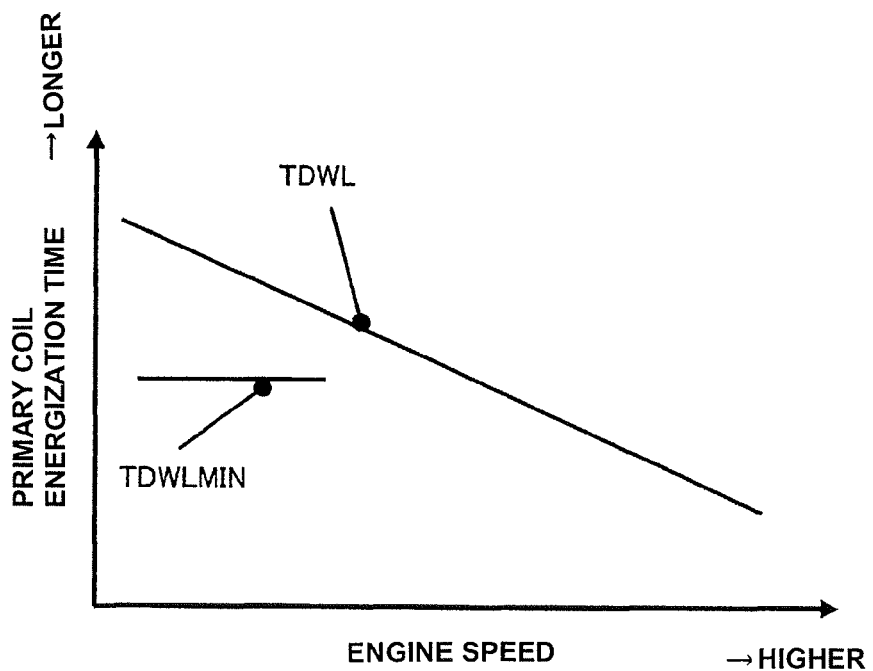
FIG. 5 is a characteristic diagram illustrating energization time characteristics with respect to engine revolution speed.

Referring to FIG. 5 there are shown the energization time characteristics, that is, the aforementioned normal energization time TDWL during normal operation and the energization time TDWLMIN for the energy suppression region. As seen from the characteristic diagram, the normal energization time TDWL is determined based on the engine speed of internal combustion engine 1, and has a characteristic such that the normal energization time TDWL shortens, as the engine speed increases. In contrast, the energization time TDWLMIN for the energy suppression region is constant regardless of engine speeds within the energy suppression region "A". When comparing these energization times for the same engine speed, the energization time TDWLMIN for the energy suppression region is set shorter than the normal energization time TDWL during normal operation.

Figure 6:
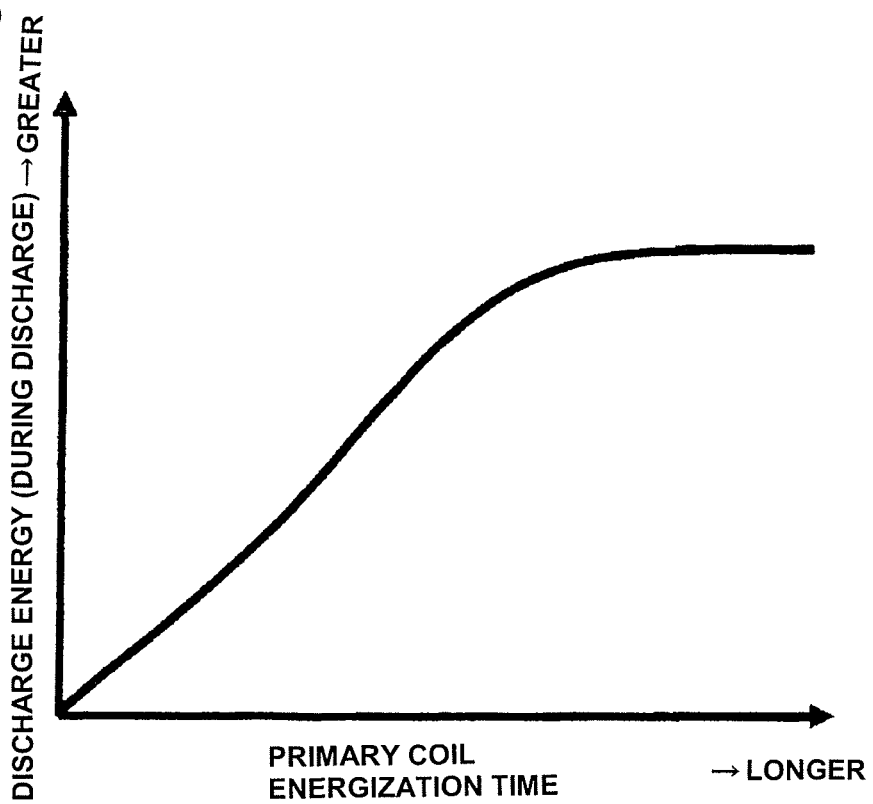
FIG. 6 is a characteristic diagram illustrating the relationship between primary coil energization time and discharge energy.

As shown in FIG. 6, there is a correlation between the energization time for the primary coil 22a and the discharge energy during discharge. That is to say, basically, the discharge energy tends to increase, as the energization time lengthens. When the energization time becomes longer to some extent, the discharge energy becomes kept approximately constant.

Figure 7:
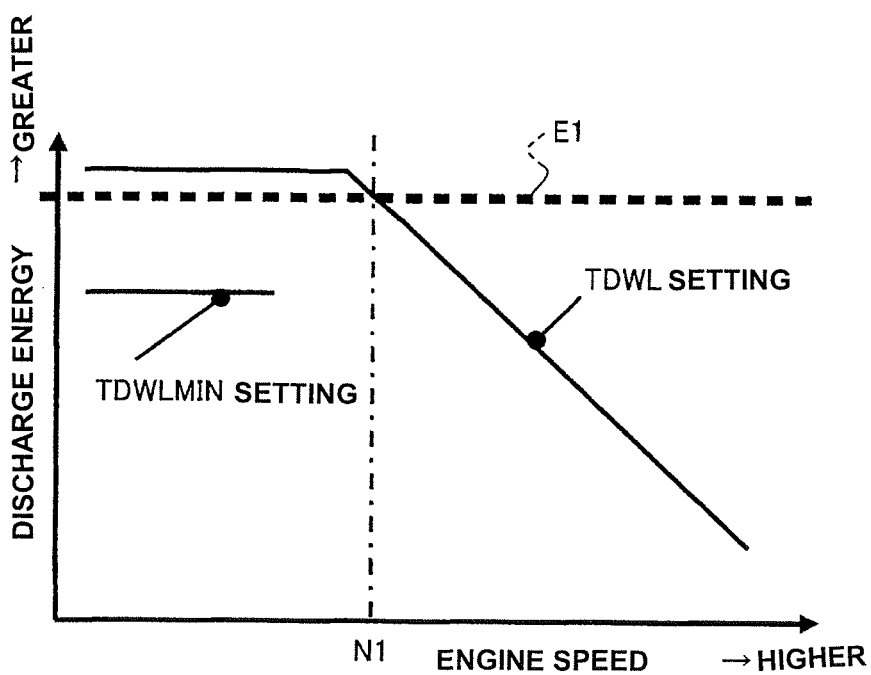
FIG. 7 is a characteristic diagram illustrating discharge-energy characteristics with respect to engine speed.

In view of the aforementioned characteristics shown in FIG. 5 as well as the characteristic shown in FIG. 6, the discharge energy (during discharge) of the shown embodiment has a characteristic as shown schematically in FIG. 7 with respect to engine speed. That is, in the normal region other than the energy suppression region "A", the discharge energy is kept approximately constant until a certain engine speed is reached. Immediately when the engine speed exceeds the certain engine speed, the discharge energy tends to reduce in accordance with an increase in engine speed. Hereupon, the broken line E1 of FIG. 7 indicates a level of discharge energy required in the previously-discussed hardly-flammable operating region (the EGR region) "B". Hence, in a low- and mid-speed region in which the discharge energy is kept approximately constant, concretely, in the predetermined engine speed region until the certain engine speed N1, it is possible to obtain a discharge energy exceeding the discharge-energy level E1 required in the operating region "B". The previously-noted engine speed N1 is a revolution speed exceeding at least an upper limit revolution speed for the hardly-flammable operating region "B", and therefore it is possible to always obtain the discharge energy higher than or equal to the required discharge-energy level in the hardly-flammable operating region "B".

On the other hand, in the energy suppression region "A", engine-speed-independent energization time TDWLMIN is used, and thus the discharge energy becomes kept constant within the revolution speed range of energy suppression region "A". At this moment, the discharge energy becomes lower than the required level in the hardly-flammable operating region "B", indicated by the broken line E1, and also becomes always lower than the discharge energy based on the energization time TDWL for the normal region.

Figure 8:
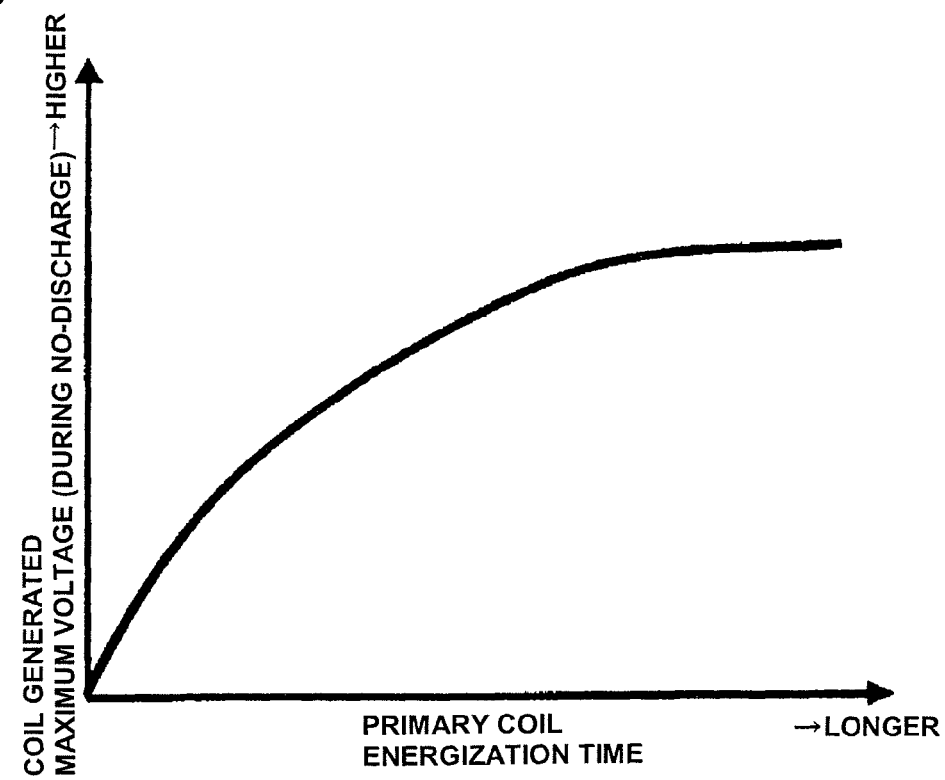
FIG. 8 is a characteristic diagram illustrating the relationship between primary coil energization time and coil generated maximum voltage during no-discharge.

Also, in the case that no electric discharge has been generated when having interrupted energization to the primary coil 22a, a high voltage is produced in the ignition coil 22. At this moment, the coil generated maximum voltage with respect to the energization time for the primary coil 22a becomes a characteristic as shown in FIG. 8. That is to say, this characteristic slightly differs from the characteristic of FIG. 6 during discharge, but has a similar tendency such that the coil generated maximum voltage increases, as the energization time lengthens, and also becomes kept approximately constant when the energization time becomes longer to some extent.

Figure 9:
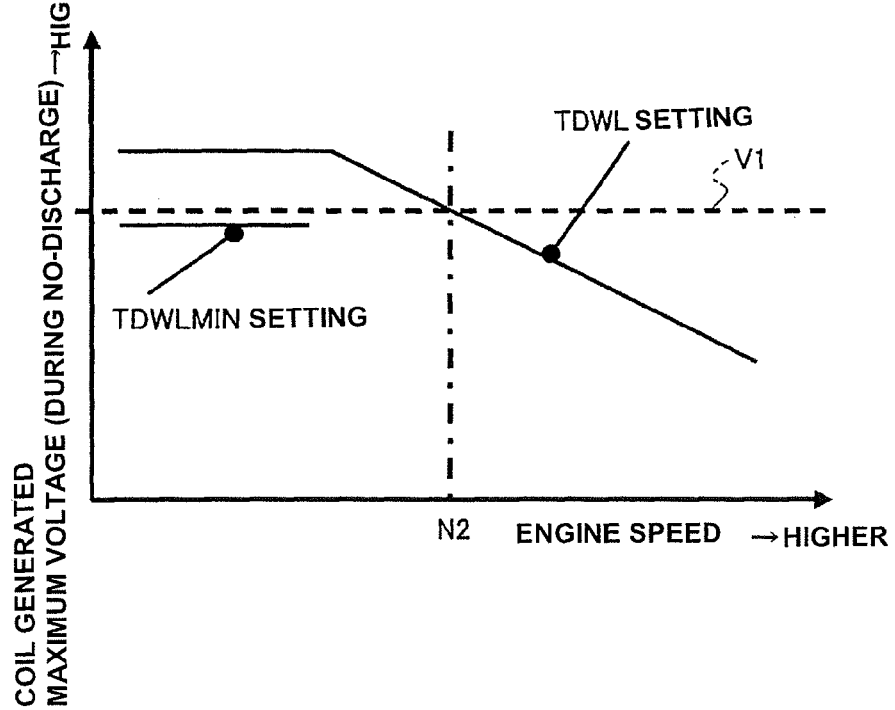
FIG. 9 is a characteristic diagram illustrating no-discharge period coil generated maximum voltage characteristics with respect to engine speed.

In view of the aforementioned characteristics shown in FIG. 5 as well as the characteristic shown in FIG. 8, the no-discharge period coil generated maximum voltage of the shown embodiment has a characteristic as shown schematically in FIG. 9 with respect to engine speed. That is, in the normal region other than the energy suppression region "A", the coil generated maximum voltage is kept approximately constant until a certain engine speed is reached. Immediately when the engine speed exceeds the certain engine speed, the coil generated maximum voltage tends to reduce in accordance with an increase in engine speed. Hereupon, the broken line V1 of FIG. 9 indicates a withstand voltage of the insulator of spark plug 9. Hence, in the predetermined engine speed region until the certain engine speed N2, it is possible to produce a coil generated maximum voltage exceeding the withstand voltage V1. However, in the normal region to which the energization time TDWL is applied, there is no possibility of occurrences of pre-ignition, and thus there is no possibility of no-discharge caused by pre-ignition. Thus, there is no fear of exceeding the withstand voltage V1 due to no-discharge.

On the other hand, in the energy suppression region "A", engine-speed-independent energization time TDWLMIN is used, and thus the coil generated maximum voltage becomes kept constant within the revolution speed range of energy suppression region "A". Owing to the comparatively short energization time TDWLMIN, at this moment, the coil generated maximum voltage becomes lower than the withstand voltage of spark plug 9, indicated by the broken line V1, and also becomes always lower than the coil generated maximum voltage based on the energization time TDWL for the normal region. Therefore, even when, in a low-speed high-load region belonging in the energy suppression region "A", pre-ignition occurs and thus no-discharge occurs, the coil generated maximum voltage cannot exceed the withstand voltage of spark plug 9, and thus there is no possibility for the spark plug 9 to be damaged due to an electric discharge through the insulator.

As set out above, according to the embodiment, regarding characteristics of energization time for the primary coil 22a, the energization time characteristic for a prescribed low-speed high-load region (energy suppression region "A") having a possibility of causing pre-ignition and the energization time characteristic for other normal regions are set to differ from each other. Hence, it is possible to certainly avoid damage to the spark plug 9 during no-discharge which may possibly occur due to pre-ignition. At the same time, it is possible to ensure a discharge energy in a hardly-flammable operating region "B", in which a high exhaust gas recirculation (EGR) is performed, at a sufficient high level, thus achieving more certain ignition.

By the way, as discussed previously, the energization time TDWLMIN for the energy suppression region "A" is set shorter than the normal energization time TDWL. In the case of an excessively short energization time, there is no electric discharge generated between the electrodes of spark plug 9. That is, a lower limit exists in the energization time. Concretely, energization time TDWLMIN is set such that the coil generated maximum voltage shown in FIG. 8 fulfills a lowest voltage that can generate an electric discharge between the electrodes at wide open throttle (WOT) in which the in-cylinder gas density becomes highest in the energy suppression region "A". In the previously-discussed embodiment, energization time TDWLMIN is set as a fixed value. However, in-cylinder gas densities in the energy suppression region "A" slightly differ from each other, and thus the energization time TDWLMIN may be variably set depending on individual operating conditions in the energy suppression region "A", while taking account of the slight gas-density difference.

While the foregoing is a description of the embodiments carried out the invention, it will be understood that the invention is not limited to the particular embodiments shown and described herein, but that various changes and modifications may be made without departing from the scope or spirit of this invention.

Figure 10:
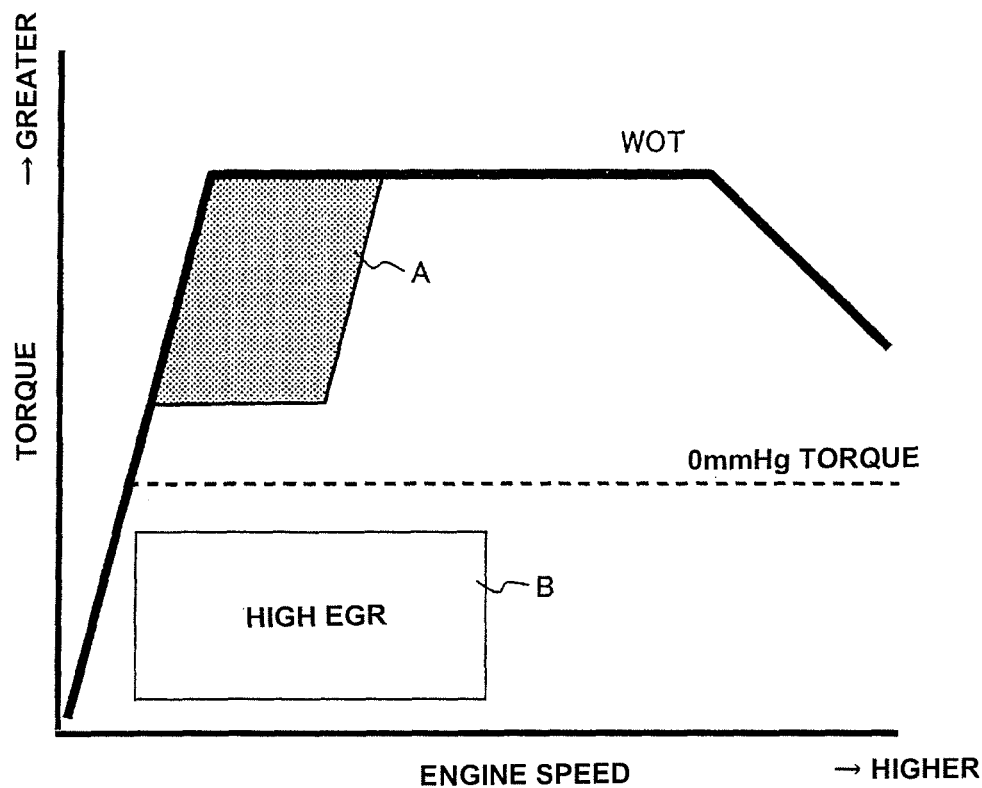
FIG. 10 is a characteristic diagram illustrating another example of the prescribed operating region setting.
Figure 11:
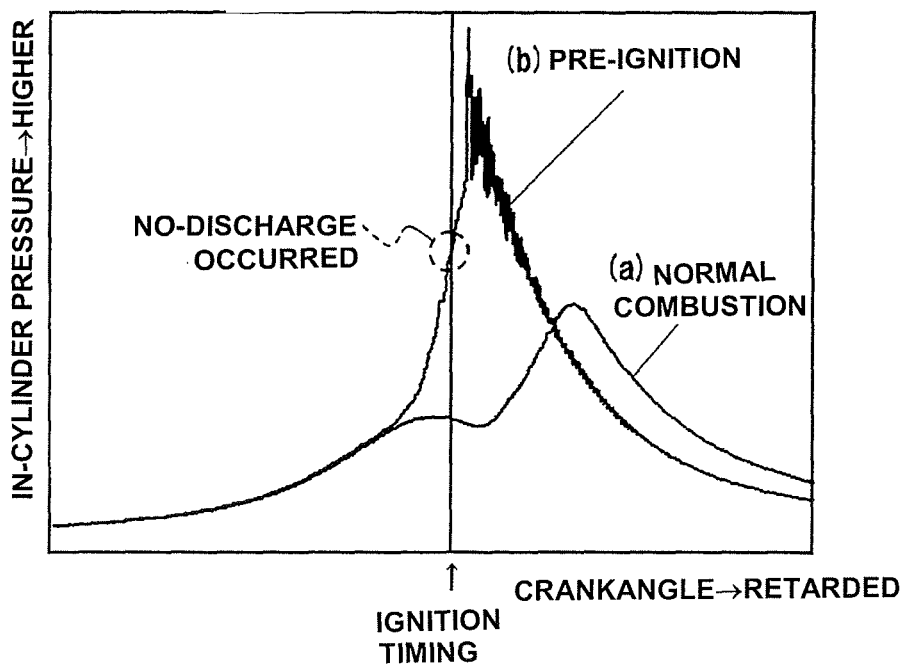
FIG. 11 is a characteristic diagram illustrating both an in-cylinder pressure change during normal combustion and an in-cylinder pressure change during the occurrence of pre-ignition.

For instance, FIG. 10 shows another example of a low-speed high-load region belonging in the energy suppression region "A". In this manner, in setting a prescribed region belonging in the energy suppression region "A", the energy suppression region has to be set in accordance with an operating region having a possibility causing pre-ignition actually for an intended internal combustion engine.

Also, the ignition device of the embodiment is exemplified in a turbo-supercharger equipped supercharged engine. However, pre-ignition that causes no-discharge may possibly occur in a natural-aspirated engine. Hence, in a similar manner to the supercharged engine, the inventive concept can be applied to a natural-aspirated engine.

By the way, as a hardly-flammable operating region, a lean-burn operating region, a Miller-cycle operating region and the like may be enumerated in addition to a high EGR operating region. Therefore, it is desirable to set the characteristic of energization time TDWL for the normal region in a manner so as to obtain a discharge energy exceeding a discharge-energy level required for each individual intended hardly-flammable operating region.

The invention claimed is:

1. An ignition device of an internal combustion engine in which a discharge voltage is generated between electrodes of a spark plug connected to a secondary coil by energizing a primary current to a primary coil of an ignition coil and interrupting the primary current, which comprises:
   an engine control unit configured to:
   set a first energization time for the primary coil according to an engine speed in a normal region other than a prescribed engine-speed engine-load region having a possibility of causing pre-ignition before ignition timing; and
   set a second energization time for the primary coil relatively shorter than the first energization time for a same engine speed, in the prescribed engine-speed engine-load region, and
   wherein the engine control unit is configured to energize the primary coil for the first energization time in the normal region, and
   wherein the engine control unit is configured to energize the primary coil for the second energization time in the prescribed engine-speed engine-load region, for avoiding a maximum voltage induced in the secondary coil under no-discharge when having interrupted the primary current from exceeding an allowable voltage which an insulator of the spark plug can withstand without being damaged due to an electric discharge through the insulator.

2. The ignition device of the internal combustion engine as recited in claim 1, wherein:
   a characteristic of the first energization time for the normal region is set such that the maximum voltage generated under no-discharge when having interrupted the primary current exceeds the allowable voltage of the insulator of the spark plug in a predetermined engine speed region.

3. The ignition device of the internal combustion engine as recited in claim 2, wherein:
   the predetermined engine speed region comprises a predetermined hardly-flammable region including any one of (a) a given EGR operating region in which a given amount of exhaust gas recirculation is performed, (b) a lean-burn operating region, and (c) a Miller-cycle combustion operating region.

4. The ignition device of the internal combustion engine as recited in claim 3, wherein:
   the internal combustion engine is an exhaust gas recirculation device equipped turbo-supercharged internal combustion engine; and
   the engine control unit is configured to:
   set the first energization time to such an extent that the maximum voltage generated under no-discharge when having interrupted the primary current exceeds the allowable voltage of the insulator of the spark plug in the given EGR operating region, and
   set the second energization time to such an extent that the maximum voltage generated under no-discharge when having interrupted the primary current does not exceed the allowable voltage of the insulator of the spark plug in the prescribed engine-speed engine-load region.

5. An ignition method of an internal combustion engine in which a discharge voltage is generated between electrodes of a spark plug connected to a secondary coil by energizing a primary current to a primary coil of an ignition coil and interrupting the primary current, comprising:
   setting a first energization time for the primary coil according to an engine speed in a normal region other than a prescribed engine-speed engine-load region having a possibility of causing pre-ignition before ignition timing,
   setting a second energization time for the primary coil relatively shorter than the first energization time for a same engine speed, in the prescribed engine-speed engine-load region,
   energizing the primary coil for the first energization time in the normal region, and energizing the primary coil for the second energization time in the prescribed engine-speed engine-load region, for avoiding a maximum voltage induced in the secondary coil under no-discharge when having interrupted the primary current from exceeding an allowable voltage which an insulator of the spark plug can withstand without being damaged due to an electric discharge through the insulator.

\* \* \* \* \*